United States Patent [19]
Kant et al.

[11] Patent Number: 5,656,494
[45] Date of Patent: Aug. 12, 1997

[54] BIOFILTER WITH MODULAR TRAYS

[75] Inventors: Wayne D. Kant, Albany; Bruce Singleton, Selkirk, both of N.Y.

[73] Assignee: Rotron Incorporated, Woodstock, N.Y.

[21] Appl. No.: 484,350

[22] Filed: Jun. 7, 1995

Related U.S. Application Data

[62] Division of Ser. No. 165,517, Dec. 10, 1993, Pat. No. 5,595,910, which is a continuation of Ser. No. 945,959, Sep. 16, 1992, abandoned.

[51] Int. Cl.⁶ .................................................. C12M 3/00
[52] U.S. Cl. ......................... 435/294.1; 435/297.1
[58] Field of Search ........................... 435/289.1, 294.1, 435/297.1; 422/122, 142, 169, 177

[56] References Cited

U.S. PATENT DOCUMENTS

| | | | |
|---|---|---|---|
| 2,200,581 | 5/1940 | Pruss et al. | 435/266 |
| 2,793,096 | 5/1957 | Pomeroy | 435/266 |
| 4,662,900 | 5/1987 | Ottengraf | 435/266 |
| 4,734,111 | 3/1988 | Hoffmann et al. | 435/266 |
| 4,850,745 | 7/1989 | Hater et al. | 405/258 |
| 5,064,763 | 11/1991 | Bentz | 435/266 |
| 5,082,475 | 1/1992 | Bentz | 55/74 |

FOREIGN PATENT DOCUMENTS

| | | | |
|---|---|---|---|
| 0 402 704 | 12/1990 | European Pat. Off. | 435/266 |
| 35 42 599 | 6/1987 | Germany . | |
| 3 641 178 | 6/1987 | Germany | 435/266 |
| 3 803 613 | 8/1989 | Germany | 435/266 |
| 62-7425 | 1/1987 | Japan | 435/266 |
| 8 602 150 | 3/1988 | Netherlands | 435/266 |

OTHER PUBLICATIONS

Leson, et al. Journal Of The Air Waste Management Assocation vol. 41, No. 8, pp. 1045–1053, Aug. 1991.
Soil Vapor Extraction Technology, Reference Handbook EPA/540/2–91/003, pp. 83–96, Feb. 1991.
Process Engineering, pp. 66–67, 69, Sep. 1988.
Duncan, et al., Journal Of The Air Pollution Control Association vol. 32, No. 11 pp. 1175–1179, Nov. 1982.
Carlson et al. Journal WPCS, vol. 38, No. 5 pp. 829–840, May 1966.
Bohn, APCA Note–Book, vol. 25, No. 9, pp. 953–954, Sep. 1975.
Chiou et al. Environ Sci Technol., vol. 19, No. 12 pp. 1196–1200 (1985).
Hazmat World, pp. 11–16, Sep. 1990.
Venterea et al. ABB Journal, vol. 4, No. 5, pp. 6–7 May/Jun. 1991.

*Primary Examiner*—David A. Redding
*Attorney, Agent, or Firm*—Wolf, Greenfield & Sacks, P.C.

[57] ABSTRACT

A biofilter for the removal of contaminants from gas streams disclosed. The biofilter makes use of a series of modular trays, each containing a gas-contacting medium for removing at least one contaminant from the process stream. The trays have a modular design that allows them to be sealingly stacked and to be configured to allow series, parallel or series-parallel flow through the biofilter.

14 Claims, 7 Drawing Sheets

BIOFILTER WITH MODULAR TRAYS

This application is a divisional of application Ser. No. 08/165,517, filed Dec. 10, 1993, entitled BIOFILTER WITH MODULAR TRAYS, and now U.S. Pat. No. 5,595,810, which in turn is a File Wrapper Continuation of application Ser. No. 07/945,959, filed Sep. 16, 1992 and now abandoned.

FIELD OF THE INVENTION

This invention relates to a biofilter for use in the removal of contaminants from process gas streams.

BACKGROUND OF THE INVENTION

Among the numerous challenges facing the environmental cleanup and detoxification industry is the problem of removing contaminants from soil. In particular, there exists a substantial need for improvement in the methods for removal of volatile hydrocarbons (VOC's) from contaminated soils. Because of the large number of underground storage tanks, many having leaks, the need for an effective means of soil decontamination is significant.

Among the techniques that are presently employed to remove contaminants such as VOC's from soil is a process known as extraction or soil venting. This process involves pulling air through the soil with blowers, thereby causing soil-borne VOC's to enter the airstream and be pulled to the surface and out of the soil. Once the airstream containing the VOC's is obtained, removal or decomposition of the VOC's is necessary.

Unfortunately, most pollution cleanup systems currently in operation simply change the phase of the contaminant. For example, in many older systems, VOC's which are stripped from ground water or soils are simply discharged into the atmosphere without treatment. This contributes to smog formation and low altitude ozone formation. In recent years, it has become widely recognized that it is unacceptable to simply remove the contaminant from soil or water and release it into the atmosphere. Rather, it has become recognized that there is a need to provide further processing to break down the contaminant to thereby minimize its effects on the environment.

To that end, numerous technologies exist that are employed to control VOC emissions in soil venting and similar contaminant removal systems. These include activated carbon filtration, high temperature thermal incineration and catalytic destruction. Although each of the systems is known to be efficient if the operating parameters are maintained within an optimum range, they all suffer from serious disadvantages.

For example, although activated carbon can remove VOC's from airstreams at very high efficiencies, carbon has only a limited capacity to adsorb any particular compound and quickly becomes saturated. Once the saturation limit is reached, the carbon bed will "break-through" and cease to be functional as a treatment system. When break-through occurs, the carbon bed must be regenerated or disposed of. Contaminated carbon is considered a hazardous waste under federal statutes and thus becomes very expensive to dispose of. Although some carbon companies offer regeneration facilities or on-site steam regeneration, the VOC's captured by the carbon still remain. Thus, when a VOC-saturated carbon bed is regenerated, condensed steam containing the VOC's removed from the carbon becomes hazardous waste. Furthermore, since the VOC's remain unchanged chemically, having been carried from soil ultimately into steam, only the phase of the contaminant has been changed. As an additional drawback, large volumes of carbon are needed for vapor phase systems, particularly if the VOC concentrations at the contaminated site exceed a few parts per million (ppm).

Alternatively, many contaminants can be incinerated at high temperatures. At temperatures exceeding about 1400° F., the molecular bonds which hold organic molecules together fail. This principle can be applied in thermal incineration systems in which the process airstream containing VOC's is heated to above the decomposition temperature and maintained there for a certain residence time. This allows all of the organic contaminants contained in the process airstream to be destroyed. Thermal incineration is typically carried out using fluidized bed combustors, rotary kilns and special furnaces. Unfortunately, effective decomposition of contaminants present at the concentrations found in typical pollution control systems requires that large amounts of fuel be added to the contaminated airstream in order to achieve the necessary temperatures. Thermal incineration systems are also very expensive to maintain and operate and suffer from operation expenses which vary drastically with the fluctuating price of fuel supplies.

In an alternative incineration technique, catalytic reactions have been used. Catalytic incineration works on the same principle as thermal technologies, except that a catalyst is employed to lower the temperature at which the organic contaminants are destroyed. Many catalytic incinerators include heat exchangers to improve the process efficiency. Unfortunately, catalytic incinerators still require large amounts of fuel or electricity when VOC concentrations in the process airstream are low. Such systems also tend to be very expensive, complicated and subject to catalyst poisoning, a condition that occurs when the catalyst is transformed by a chemical reaction rather than facilitating it. In systems using platinum catalyst, for example, lead contaminants act as a poison. Once poisoned, the catalysts must be replaced, adding further significant expenses to the operation of such incinerators.

As an alternative to soil venting in which contaminates are removed from soil and then subsequently processed, a variety of in situ methods for the biological digestion of various contaminants have been used. These systems are often referred to as bioremediation systems. For example, U.S. Pat. No. 4,850,745 to Hater et al. describes a system for treating soil contaminated with petroleum hydrocarbons. The system comprises an excavated cavity containing a layer of gravel which covers a bacterial culture capable of degrading petroleum hydrocarbons. A piping system capable of distributing nutrients directly to the cultures and a means for providing air flow through the area containing the cultures are provided as well. In use, air from the surface is pulled through the contaminated soil and directly into the bacterial cultures, thereby entraining contaminants and allowing them to be digested by the bacteria prior to release into the atmosphere. Although such a system may be useful for cleaning contaminated soil in a limited area, i.e., such as that lying directly beneath a leaking petroleum storage tank, the system suffers from the disadvantage of requiring excavation and installation prior to the installation of the storage tank, the inability to easily alter or expand the treatment area, and the inability to provide adequate process controls to maintain the decontamination process within optimum reaction parameters.

Thus, a need exists for a treatment system having a low capital cost, a high removal efficiency, low maintenance, and minimal energy requirements. In addition, a need exists for a relatively simple yet effective means for removing contaminants, such as VOC's from a process airstream.

SUMMARY AND OBJECTS OF THE INVENTION

The present invention provides a modular biofilter for removing contaminants from an airstream. More specifically, the invention pertains to a modular unit having a series of stackable trays, some or all of which contain a gas-contacting medium that is adapted for the removal of contaminants such as VOCs from a process airstream. The stackable trays are formed of a molded polymeric material and are adapted to provide structural support for numerous layers of biologically active, gas-contacting material while also serving to provide an insulated vessel and an air distribution plenum. The trays may be rotationally molded and can be formed of recycled polymeric resins if desired.

The present invention offers numerous advantages over biofiltration systems of the prior art. In particular, the modular nature of the stackable trays allows the number of trays, (and corresponding active surface area of the gas-contacting medium) to be increased or decreased with ease depending upon the requirements of the particular contamination site. Additionally, the modular nature of the system allows the biofilter to be assembled on-site with a minimum of equipment and personnel needed to accomplish the assembly.

In the broadest embodiment, each tray comprises a generally circular form having a vertical sidewall, and a bottom portion having a gas distribution plenum. The sidewall and bottom define a region for containing a gas-contacting medium such as a compost having a consortium of indigenous hydrocarbon degrading bacterial cultures. In addition, a gasket, such as an O-ring, is provided to allow the trays to be stacked vertically in a sealed arrangement. The trays may also contain inlet and outlet ports, and ports for allowing sensors to monitor the interior conditions of the biofilter.

Thus, it is one object of the present invention to provide a biofilter formed of a series of identical trays to allow the unit to be readily transportable, easily assembled, and capable of being tailored to a specific application or waste site.

It is another object of the present invention to provide a modular tray that may be stacked to form a biofilter.

It is still a further object of the present invention to provide a biofilter constructed of modular units that may be mass produced.

It is still a further object of the present invention to provide a modular biofilter having a plenum incorporated therein.

These and other objects and details of the present invention will become apparent with reference to the following detailed description and drawings.

DETAILED DESCRIPTION OF THE INVENTION

Figure 1:
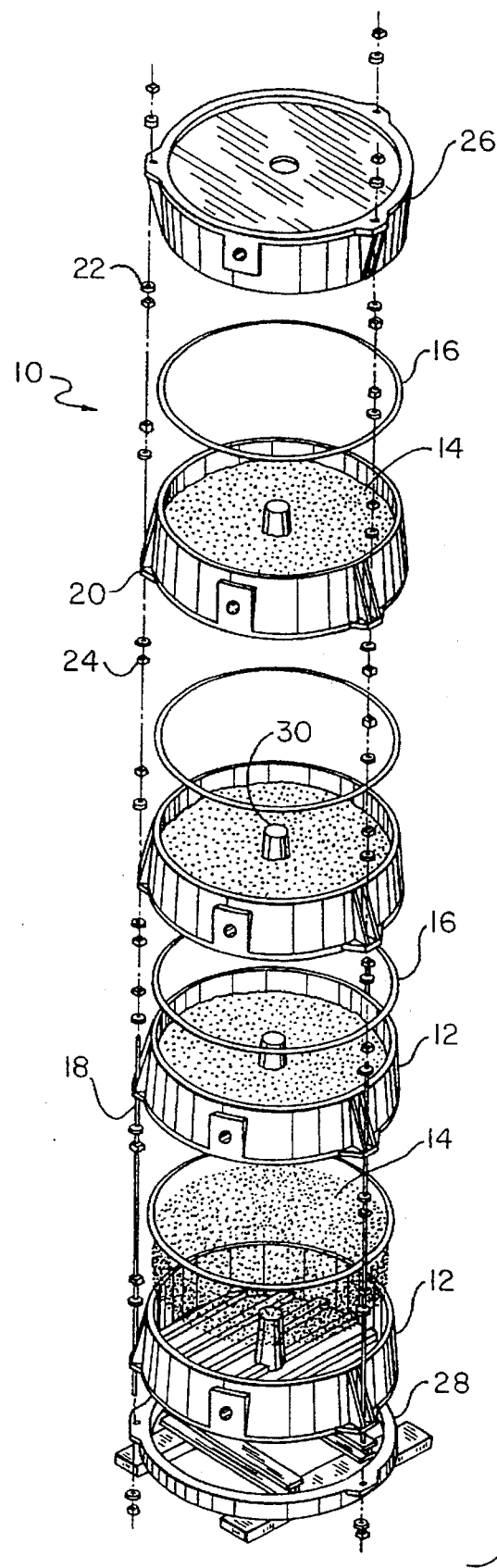
FIG. 1 is an exploded view of one embodiment of the biofilter of present application.

FIG. 1 depicts one embodiment of a biofilter 10 of the present invention. As shown in FIG. 1, a plurality of trays 12 each containing a gas-contacting medium 14 are stacked in a vertical arrangement. A gas-tight seal is achieved between each of the successive trays by means of O-rings 16 which are positioned between each tray 12 to provide a seal. Once the trays are stacked together, a plurality of tie rods 18 are inserted through flanges 20 on each tray 12 to lock the stack of trays together. It is preferred that the tie rods 18 be threaded along their entire length to thereby allow a washer 22 and nut 24 to be positioned adjacent to the upper and lower surface of each flange 20 to distribute locking forces along the entire length of the biofilter stack. A cap 26 may be used to seal the top the assembly and a base or skid 28 may be used to provide reinforcement for the bottom of the assembly. The cap may comprise a screen or a perforated panel, but in the preferred embodiment, the cap comprises an inverted tray 12. The use of an inverted tray having a defined gas outlet (as will be described shortly) allows the exit conditions of a process stream to easily monitored. Each of the trays includes a central hub 30. The hub assists in positioning the adjacent trays for purposes of sealing and alignment of flanges 20 to accommodate the tie rods 18. As will be discussed in detail shortly, at least one tray includes an inlet for a process gas stream containing contaminants and at least one tray an outlet for the purified gas stream.

The gas-contacting medium comprises a substrate that includes numerous microbial cultures capable of metabolizing contaminants contained in the air stream. Ordinary compost, such as is widely available from numerous landfills and composting facilities, includes a consortium of indigenous hydrocarbon degraders, and is thus well-suited for use as the gas contacting medium of the present invention. For example, the primary volatile components of gasoline (benzene, toluene, ethylbenzene and xylene) may be readily metabolized by many of the hydrocarbon-consuming microbial cultures found in compost, including *Pseudomonas putida* and *Pseudomonas aeruginosa*. The bacteria contained in compost is also capable of consuming, among other organic solvents, chlorinated solvents such as trichloroethylene (TCE).

In addition, a compost mixture having components adapted to increase the residence time of the process gas may be used. Thus, in one preferred embodiment, a mixture comprising compost and various clays is substituted for straight compost. The mixture, (referred to as a 60:30:10 mix), comprises 60% by weight compost, 30% by weight Fuller's Earth (a non-colloidal attapulgite clay, preferably having an 80/50 mesh size), and 10% by weight PT1E (an organophilic clay adapted to absorb hydrocarbons, available from Bentec Inc., Ferndale, Mich.). In addition, a small amount, preferably less than 1% by weight, of a nutrient for the bacteria may be used. A preferred nutrient is Max Bac, a timed release bioremediation nutrient source available from Grace Sierra Horticultural Products Company of Milpitas, Calif.

The invention is not intended to be limited to the use of specific gas-contacting media but rather, is intended to include any of a wide variety of media for removing contaminants from a gas stream. Thus, for example, the composition of the gas-contacting medium may differ from tray to tray. Furthermore, the invention is not intended to be limited solely to the use of gas-contacting media containing bacteria, but rather may include non-bacterial media as well. For example, at least one tray of the biofilter may include activated carbon to provide chemical "polishing" of the decontaminated gas stream.

In the case in which the gas-contacting media is a substrate containing a microbial culture, the substrate preferably comprises the 60:30:10 mix described above. This material is particularly desirable since it is relatively inert, yet contains a large supply of nutrients as well as a large surface area. Optionally, an inert packing, such as pine bark, can be positioned below the medium to diffuse the flow of the process gas stream and prevent channeling. Additionally, activated carbon can be added directly to the medium to increase the effective residence time of any contaminants that are present in a low concentration or are metabolized by the microbial cultures at a slower rate.

Figure 2:
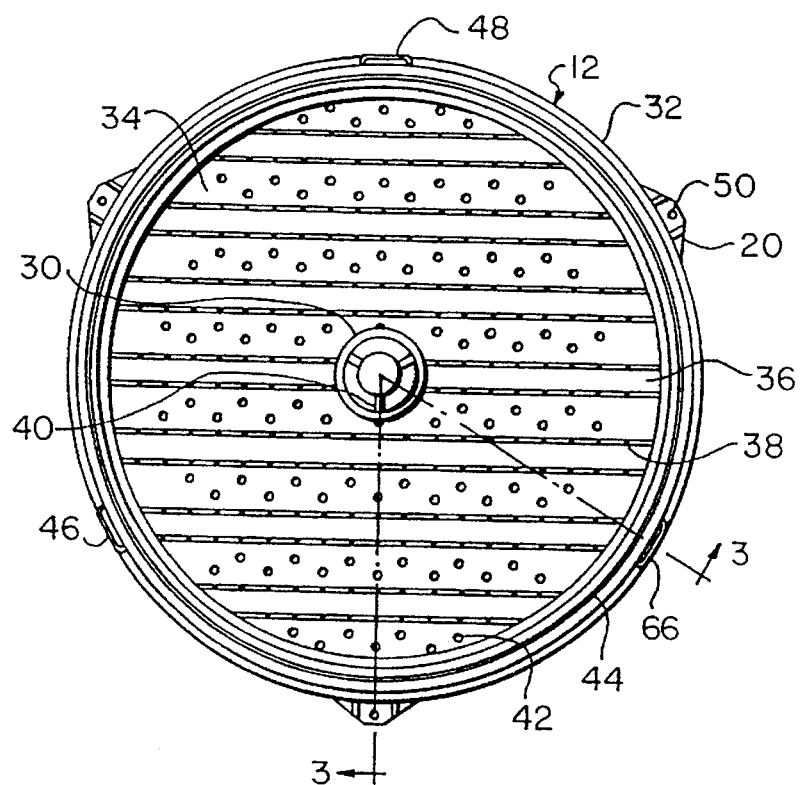
FIG. 2 is a top view of a biofilter tray.
Figure 3:
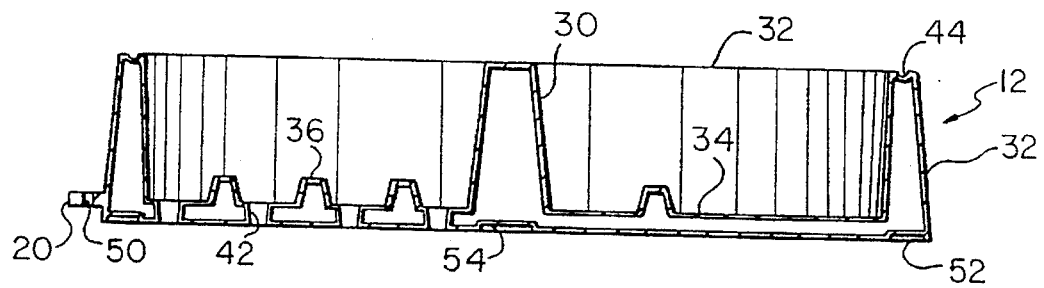
FIG. 3 is an elevation of a biofilter tray.

FIGS. 2 and 3 depict one embodiment of a tray 12 for use in the biofilter. The tray 12 preferably has a circular configuration with a peripheral side wall 32 extending upwardly from a bottom portion 34. Although the tray may be formed to virtually any size, in one preferred embodiment, the tray has a diameter of between 50 and 60 inches. In FIG. 2, which depicts a top-view of the tray, it can be seen that the tray bottom 34 includes a plurality of upwardly extending, parallel ribs 36 containing numerous outlet holes 38. The ribs define the upper surface of a plenum through which a contaminated gas stream may be flowed. The gas stream exits the plenum through the outlet holes 38 and into the gas-contacting medium contained in the tray. The details of the plenum as well as the gas inlet and outlet are described in more detail in the description of FIG. 3.

The tray also includes a central hub 30 which extends upwardly from the center of the bottom portion 34 and has a number of alignment flanges 40 that allow numerous trays to be fitted together with their external flanges 20 in linear alignment. The bottom portion 34 of the tray also includes numerous circular drains 42 which, if perforated, allow any liquids present in the filter to drain to its lowermost portion. The drains 42 also act as pillars, thereby providing structural support to the bottom portion 34 of the tray.

A sealing groove 44 is provided in the upper surface of the peripheral wall 32 to accommodate an O-ring which is used to facilitate the seal between adjacent trays. A gas inlet 46 and a gas outlet 48 are also provided in the peripheral side wall.

The flanges 20, which are preferably integrally molded into the side wall 32, serve two functions. First, they provide gripping points by which the trays may be lifted by light equipment such as a fork-lift, and they also contain apertures 50 through which tie rods may be inserted to lock adjacent trays to one another.

In a preferred embodiment, the tray is fabricated of a polymeric material which has been molded using a rotation molding technique. As will be described in more detail in the description of FIG. 3, the tray is an essentially hollow body, and such hollow bodies are well suited to fabrication using rotational molding methods. The polymeric material comprising the tray preferably comprises a high density polyethylene and most preferably comprises a recycled polymer. One additional advantage of the rotational molding method is that the tray may be fabricated in its entirety without the need to later attach parts such as the flanges 20 or the central hub 30. Additionally, the molding technique allows text and symbols, such as assembly and use instructions, company logos, and the like, to be molded directly into the side wall for permanent viewing.

A cutaway elevation of the tray is presented in FIG. 3. In FIG. 3, it can be readily seen that the side wall 32 and bottom portion 34 of the tray are hollow, thereby defining a plenum through which a process stream, such as a contaminated gas stream may enter the tray interior. The plenum comprises a plurality of ribs 36 extending along the bottom in a parallel relationship. As may be seen on the right side of FIG. 3, a view that is not in a direction parallel to the ribs, the plenum extends into the side wall 32 and communicates with both the ribs 36 and the central hub 30. The left side of FIG. 3, shows a view that is in a direction parallel to that of the ribs. This view allows the drains 42 to be seen. The bottom portion 34 of the tray includes, around its lower circumference, a sealing channel 52 which is designed to engage the upper portion of the peripheral wall of an adjacent tray. As described previously, the upper portion of the peripheral wall includes a groove 44 for seating an O-ring thereby allowing a gas-tight seal to be achieved between adjacent trays. The bottom portion 34 also includes a hub engagement zone 54 adapted to engage the upper portion of the hub 30 of an adjacent tray.

A gas stream can enter the plenum by either of two paths, depending upon whether the stream is being flowed through the biofilter trays either in series or in parallel. In the series configuration, the process stream enters the plenum of the lowermost tray through an inlet port 46 (described in detail in FIG. 4), flows into the ribs 36 and then exits the ribs into the gas-contacting medium through the perforations 38. For series flow, the bottom portions 34 of all trays above the bottom tray include perforations in the wall defining the bottom of the plenum, thereby allowing process gasses to flow from the gas-contacting medium of the tray below into the plenum of the adjacent, upper tray and then into the gas-contacting medium of that adjacent upper tray. Upon reaching the uppermost tray, the gas stream is allowed to exit the biofilter through a gas outlet in the peripheral side wall that communicates with the space above the gas-contacting medium.

Alternatively, for a parallel flow configuration, the bottom portion 34 defining the bottom of the plenum is not perforated. In this case, each tray includes a process stream inlet 46 positioned in the side wall through with gas may enter the plenum. Each tray also includes a gas outlet 48 positioned in the side wall and communicating with the space above the gas-contacting medium to thereby allow the process stream to exit the tray directly rather than flowing into an adjacent tray.

It is noted that the series and parallel configurations are not intended to be limiting, but rather may be used in combination. Thus, for example, configurations .exhibiting parallel flow through tray pairs may be achieved. Various flow configurations will be described below.

Figure 4:
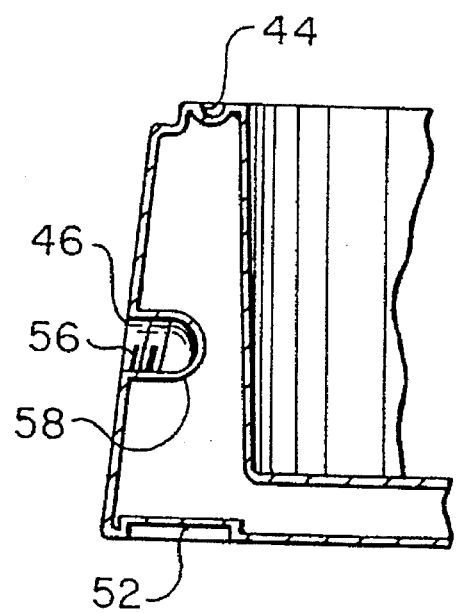
FIG. 4 is a detailed elevation of an inlet port for a biofilter tray.

FIG. 4 is a cutaway elevation of an inlet port 46. The inlet port is molded directly into the peripheral sidewall 32 and includes a threaded wall 56 and a blind wall 58. If it is desired to have a process stream enter the inlet port 46 of a given tray and thus enter the plenum of that tray, the blind wall 58 is either removed or perforated and a gas supply line can be screwed to the tray via the threaded wall 56. Gas entering the inlet port 46 flows into the tray plenum and into the gas-contacting medium through the perforations 38 in the ribs 36.

Figure 5:
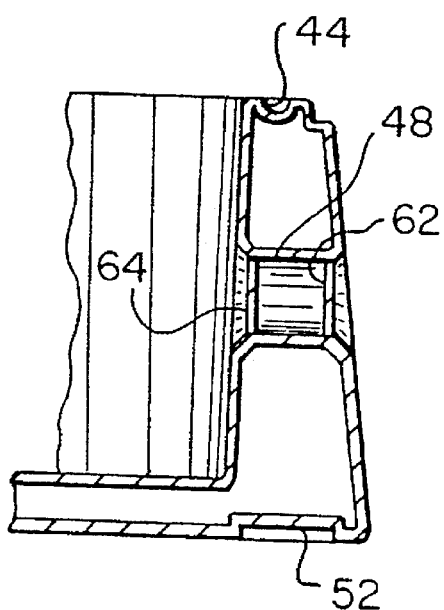
FIG. 5 is a detailed elevation of an outlet port for a biofilter-tray.

FIG. 5 depicts a gas outlet port 48 from the tray. The port is designed to allow fluid communication between the space above the gas-contacting medium and the outside of the tray. The port is isolated from the plenum to prevent inlet and outlet gasses from mixing. The port is molded to include a pair of removable sealing walls 62, 64 that, when positioned in the port, render it inoperative. Upon removal of the sealing walls 62, 64, communication between the interior of the tray and the exterior of the tray through the side wall is achieved. The tray may additionally include a plurality of posts 66 molded into the side wall 32 to provide additional structural support to the side wall.

Figure 6:
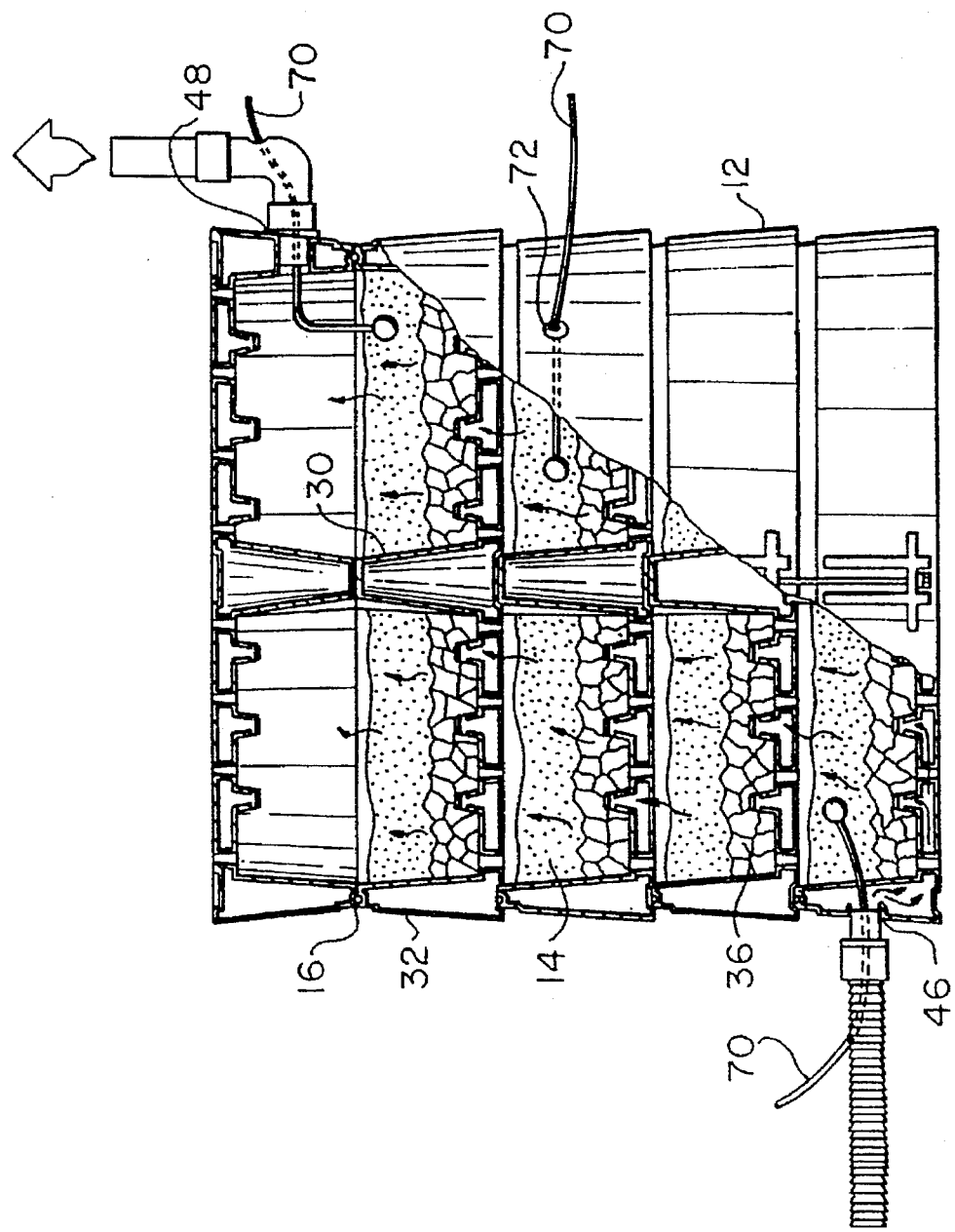
FIG. 6 is a schematic representation of a modular biofilter configured to define a series flow path.

The operation of one embodiment of a biofilter is depicted schematically in FIG. 6. In FIG. 6, four trays 12 each containing a gas-contacting medium 14 are stacked together and sealed about their peripheral walls 32 using O-rings 16. A fifth tray, that has been inverted relative to the others, acts as the upper seal of the biofilter. A gas stream is flowed into the plenum of the bottom tray through that tray's inlet port 46. The gas then flows through the ribs of the bottom tray, out through the perforations therein and into the lowermost gas-contacting medium 14. Upon exiting the medium, the gas stream enters the plenum of the adjacent tray through perforations in the bottom of the plenum of the adjacent tray. As before, the gas then exits the plenum into that tray's gas-contacting medium. This process continues until the gas reaches the space above the uppermost gas-contacting medium, this space being defined by the inverted, uppermost tray. The cleaned process gas is then allowed to exit the tray through its exit port 48.

The interior conditions of the biofilter may be monitored and controlled by numerous methods. For example, as shogun in FIG. 6, probes 70 for determining variables such as temperature, moisture content, pH, flow rates and the like may be inserted into the biofilter interior either through the inlet 46 or outlet 48 ports (whether such ports are used or not) or, through additional ports 72 that may optionally be provided in the sidewall 32 of each tray. The probes 70 may be connected to a monitoring and reacting device, such as a computer, that can modify the interior conditions in response to parameter fluctuations, quality of the inlet and outlet process streams, and the like. For example, if the probes detect a decrease in the quality of the process gas flowing through the biofilter, the flow rate of the process stream ,Dan be decreased to increase residence time of the gas in the filter, thereby allowing the microbial cultures a longer time to metabolize the contaminant. Likewise, other parameters such as temperature, moisture content, pH, and the like may be controlled as well.

Figure 7:
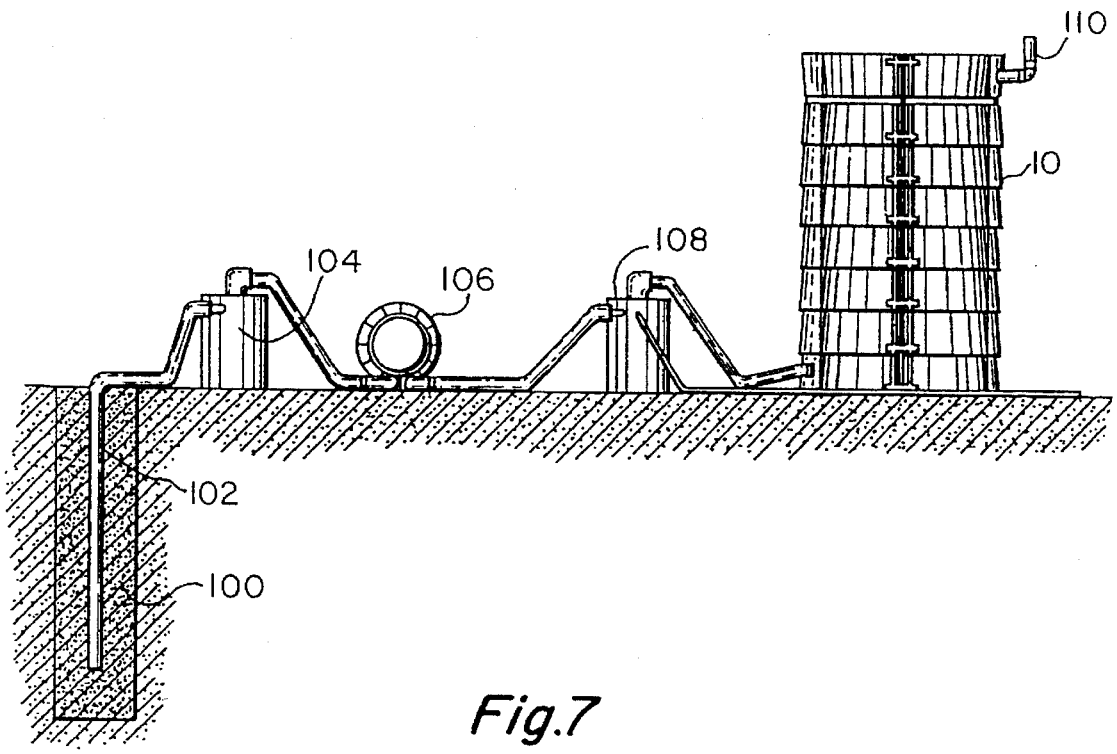
FIG. 7 is a schematic representation of a biofilter used in the series pressure configuration.

Various configurations for supplying a process gas to the biofilter an flowing it therethrough are depicted schematically in FIGS. 7–12. In FIG. 7, the series pressure configuration, a contaminated process gas stream is drawn from contaminated soil 100 into a perforated pipe 102 via an explosion proof blower 106. A moisture separator 104 removes moisture from the process stream prior to entering the blower. Subsequently, a moisturizer 108 capable of adjusting the temperature and humidity of the process stream is used to treat the stream before it enters the biofilter 10. The moisturizer preferably raises the humidity level of the process stream to approximately 100%. In so doing, the temperature of the process stream may be readily controlled due to the increased heat capacity of humid gas streams. The stream flows from the lowermost portion to the uppermost portion of the filter through the trays in series, ultimately exiting the filter into either the atmosphere or into further processing equipment by outlet tube 110.

Figure 8:
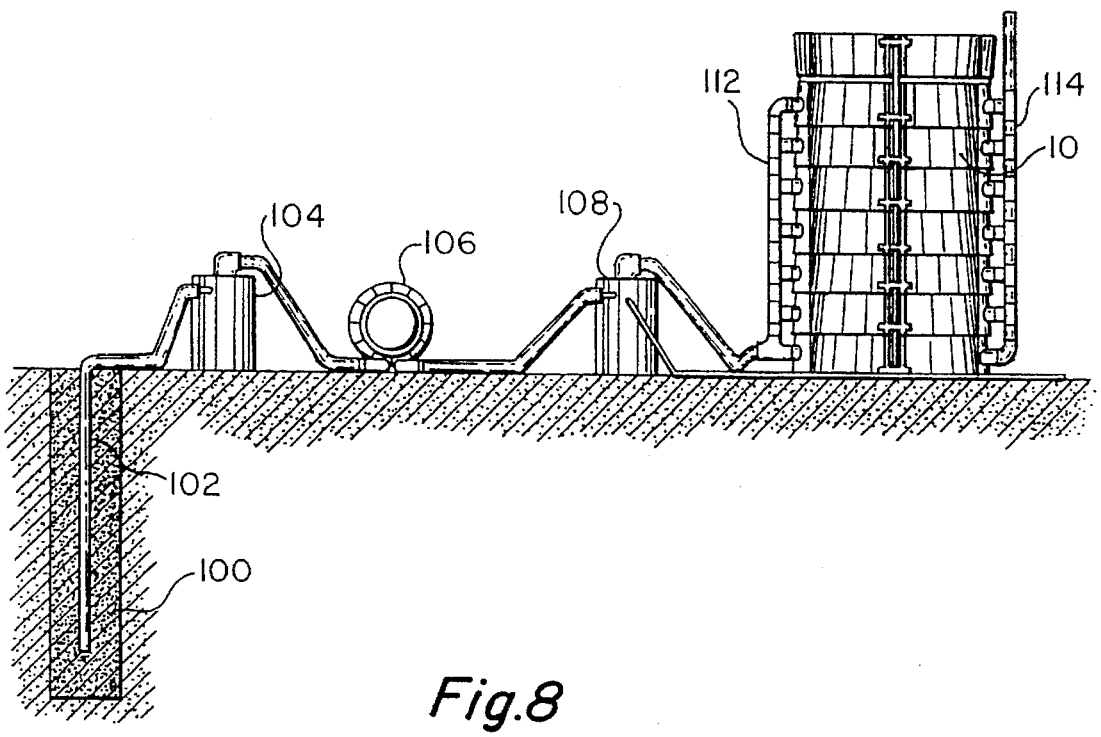
FIG. 8 is a schematic representation of a biofilter used in the parallel pressure configuration.

In FIG. 8, the parallel pressure configuration, the system is configured identically to the series pressure configuration up to the exit of the moisturizer. Upon exiting the moisturizer 108, however, the process stream is flowed into an inlet manifold 112 that causes the process stream to be split and flowed into the plenum of each tray independently and isolated from the other process streams. Each tray also has an outlet port connected to an outlet manifold 114 in which the process streams, each flowed through a single tray, are recombined and allowed to vent into the atmosphere or to subsequent processing equipment. In the embodiments of the invention in which the purified gas stream exits a tray through a tray sidewall, rather than through the top of the tray, it is preferred that the purified gas stream be withdrawn from above the top of the gas-contacting medium. Thus, the tray may be designed to have an outlet positioned in the sidewall above the fill level of the gas-contacting medium, or in the alternative, a pipe elbow may be installed on the tray-interior side of the outlet port to act as a snorkel to withdraw the process stream from above the gas-contacting medium surface.

Figure 9:
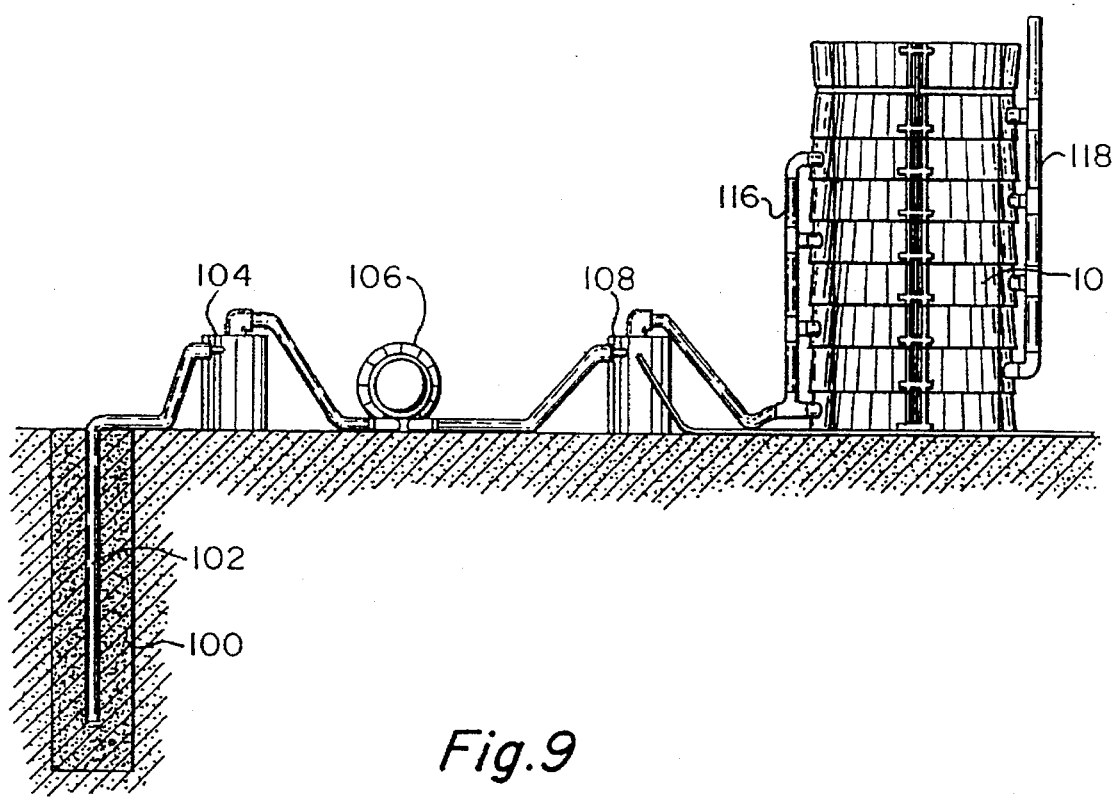
FIG. 9 is a schematic representation of a biofilter used in the series-parallel pressure configuration.

FIG. 9, the series-parallel pressure configuration, is a hybrid of the systems depicted in FIGS. 7 and 8. In FIG. 9, the front end of the system up to the exit of the moisturizer is identical to that shown in FIGS. 7 and 8. Upon reaching the biofilter 10, the process stream enters a partial inlet manifold 116 which provides gas directly into the plenums of every other tray. Each process stream flows in series from a first tray into a second tray and out through the outlet port of each second tray into a partial outlet manifold 118 where the processed gas stream is recombined and sent into the atmosphere or flowed to subsequent processing equipment. This configuration thus allows the gas stream to split into parallel streams which are each flowed in series into multiple trays.

Figure 10:
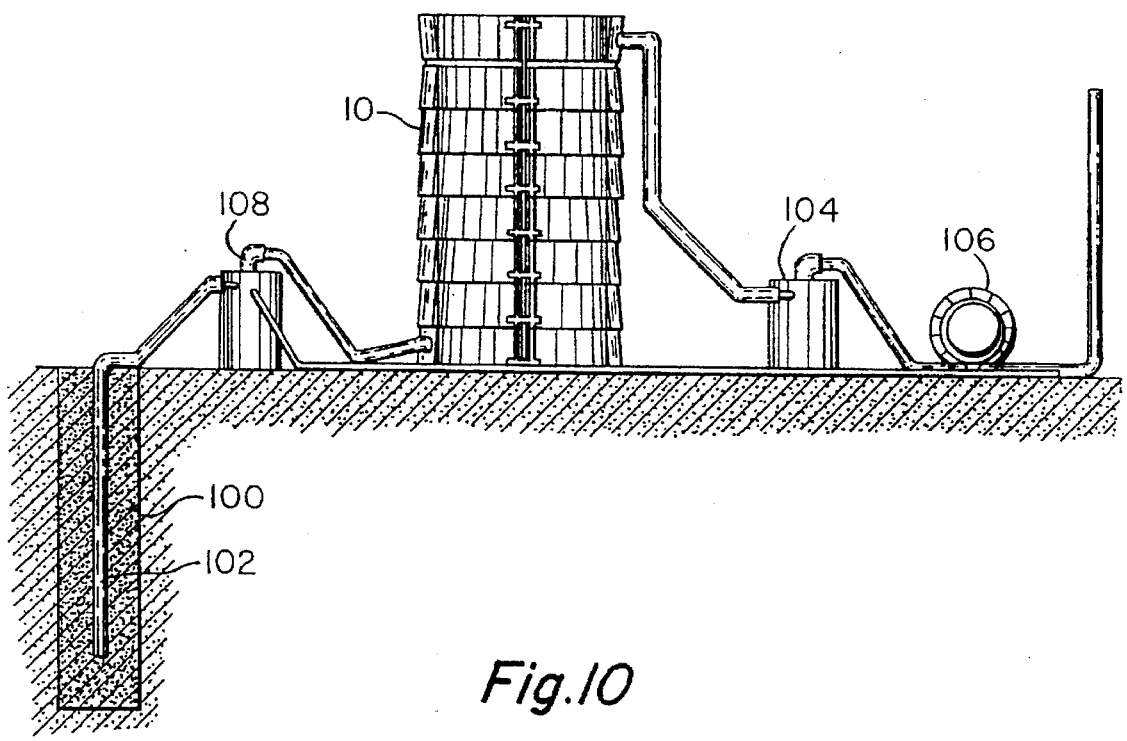
FIG. 10 is a schematic representation of a biofilter used in the series vacuum configuration.
Figure 11:
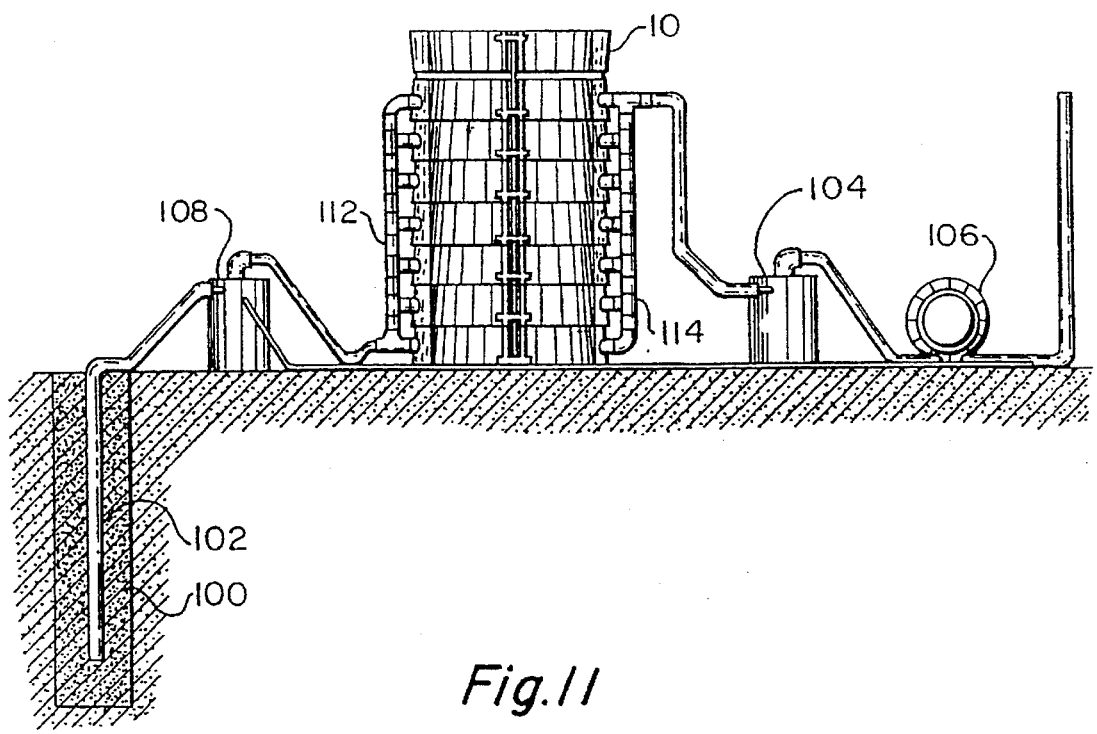
FIG. 11 is a schematic representation of a biofilter used the parallel vacuum configuration.
Figure 12:
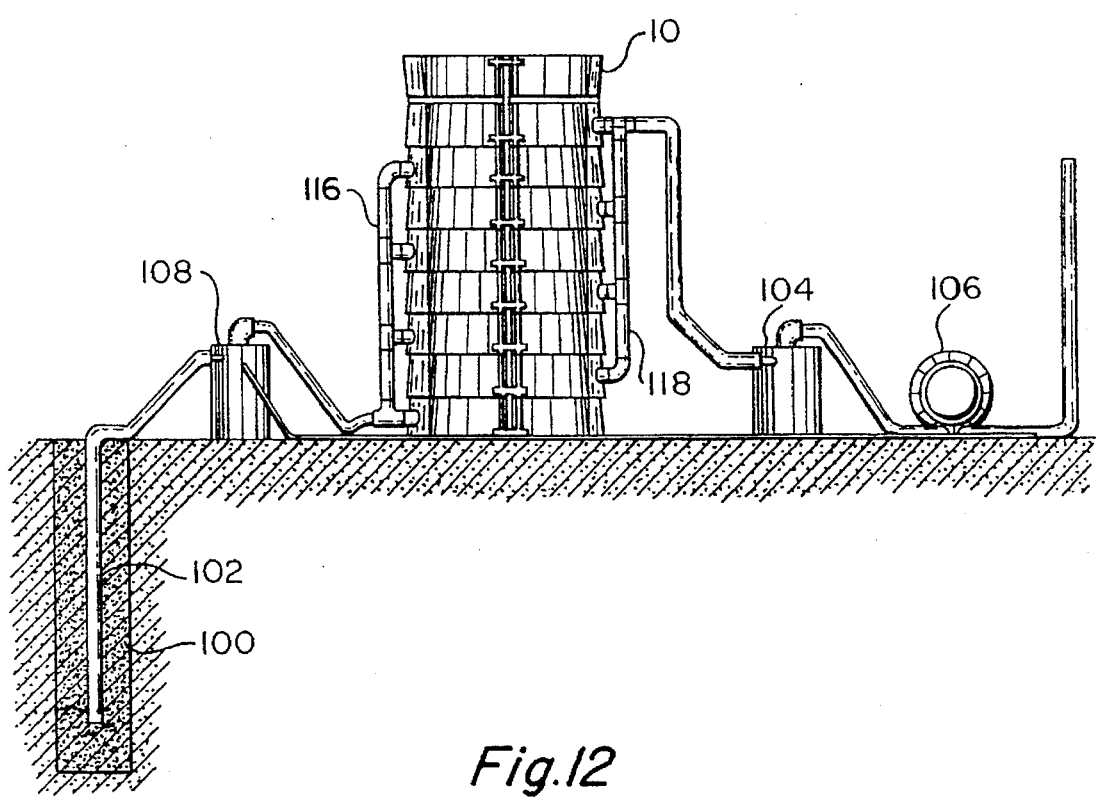
FIG. 12 is a schematic representation of a biofilter used in the series-parallel vacuum configuration.

The systems depicted in FIGS. 10–12 differ from those of FIGS. 7–9 in that in the latter figures, the process stream is flowed through the biofilter by means of a vacuum rather than by pressure. Thus, as may be seen in FIG. 10, the series vacuum configuration, a process stream is drawn from contaminated soil 100 through a perforated pipe 102 and directly into a moisturizer 108. From the moisturizer, the process stream is flowed directly into the inlet port of the lowermost tray of a biofilter 10 and allowed to proceed in series up through the biofilter exiting at its uppermost tray. Upon exiting the biofilter, the purified process stream is flowed through a moisture separator 104 and subsequently through an explosion proof blower 106 that provides the suction force drawing the process stream through the system. Upon exiting the blower 106 the process stream is vented into the atmosphere or flowed into subsequent processing equipment.

FIG. 11, the parallel vacuum configuration, is similar to the configuration of FIG. 8 with the exception that the process stream is drawn from the soil and through the biofilter 10 by means of a vacuum created by the blower 106 positioned downstream of the outlet of the biofilter. As in the parallel pressure configuration, an inlet manifold 112 and an outlet manifold 114 are used to first separate and then recombine process streams.

FIG. 12, the series-parallel vacuum configuration differs from FIG. 9 in that the process stream is drawn from the soil into the biofilter also by means of a suction force created by positioning the blower 106 downstream of the outlet port of the biofilter 10. As in the series-parallel pressure configuration, a partial inlet manifold 116 and a partial outlet manifold 118 are used to split and then recombine the process stream.

The invention is not intended to be limited to the use of a single biofilter. Rather, depending upon the specific requirements of a contamination site, numerous biofilters of the types described above may be interconnected either in series or in parallel. Furthermore, the invention is not intended to relate to configurations in which the process stream moves through a tray series only from the lowermost tray upward. Rather, the system may, if desired, be configured to allow downward or multi-directional gas flow.

EXAMPLES

The following examples are offered to illustrate and further define the invention. In each example, a prototype unit comprising a skid-mounted cylindrical steel vessel having multiple stainless steel plenums each supporting a layer of the previously described gas-contacting medium was used. The cylinder was 60" in diameter and 84" tall. Although not comprising the individual molded trays described previously, the prototype assembly was used to study the feasibility of the multi-tray configuration. Gas sampling ports were provided at the inlet, outlet, and between each layer of gas-contacting medium. Weekly samples were taken from each port using 20 ml syringes. The samples were then directly injected into an E. G. & G. Chandler Series 100 GC/FID for analysis. Output from the chromatograph was then sent to a Spectra-Physics Model 4400 integrator. The integrator calculated a species specific analysis of the concentrations of various contaminants presented in each example below.

| Contaminant | Inlet Concentration (PPM) | Outlet Concentration (PPM) | GC Retention Time |
|---|---|---|---|
| Example 1 (51.5% removal) | | | |
| Benzene | 44 | 38 | 2.8 |
| Toluene | 32 | 10 | 5.26 |
| E—Benzene | 8 | 5 | 9.52 |
| P—Xylene | 8 | negligible | 10.65 |
| M—Xylene | 12 | negligible | 11.4 |
| O—Xylene | 10 | 0.5 | 13.1 |
| Total | 100 | 55 | — |
| Example 2 (64.0% removal) | | | |
| Benzene | 49 | 38 | 2.8 |
| Toluene | 39 | 3 | 5.26 |
| E—Benzene | 6 | negligible | 9.52 |
| P—Xylene | 9 | 2 | 10.65 |
| M—Xylene | 19 | 4 | 11.4 |
| O—Xylene | 9 | negligible | 13.1 |
| Total | 114 | 41 | — |
| Example 3 (52.0% removal) | | | |
| Benzene | 34 | 33 | 2.8 |
| Toluene | 19 | 3 | 5.26 |
| E—Benzene | 4 | 0.5 | 9.52 |
| P—Xylene | 6 | 0.5 | 10.65 |
| M—Xylene | 14 | 2 | 11.4 |
| O—Xylene | 1 | 0.5 | 13.1 |
| Total | 87 | 37 | — |

| Contaminant | Inlet Concentration (PPM) | Outlet Concentration (PPM) | GC Retention Time |
|---|---|---|---|
| Example 4 (73.9% removal) | | | |
| Benzene | 17 | 10 | 2.8 |
| Toluene | 10 | 1 | 5.26 |
| E—Benzene | 1.5 | negligible | 9.52 |
| P—Xylene | 5 | negligible | 10.65 |
| M—Xylene | 9 | 0.5 | 11.4 |
| O—Xylene | 6 | 1 | 13.1 |
| Total | 44 | 11.5 | — |

Equivalents

Although specific features of the invention are included in some embodiments and drawings and not in others, it should be noted that each feature may be combined with any or all of the other features in accordance with the invention.

It should be understood that the foregoing description of the invention is intended merely to be illustrative thereof, the illustrative embodiments are presented by way of example only, and that other modifications, embodiments, and equivalents may be apparent to those skilled in the art without departing from its spirit.

Having this described the invention, what I desire to claim and secure by Letters Patent is:

1. A stackable tray for a biofilter which comprises a bottom portion with a peripheral sidewall extending therefrom, the bottom portion and sidewall defining a region for containing a gas-contacting medium, the peripheral sidewall having upper and lower edges each constructed and arranged to allow a seal between adjacent trays when such trays are stacked, the tray further including a plenum formed in the bottom portion and sidewall of the tray and constructed to allow a gas to enter the region defined by the bottom and the sidewall, the bottom portion, sidewall and plenum being integral portions of a molded one-piece structure.

2. The stackable tray of claim 1 wherein the peripheral sidewall includes a port for optionally allowing a gas to enter the plenum.

3. The stackable tray of claim 1 wherein the peripheral sidewall includes a port for optionally allowing a gas to exit from the region containing the gas-contacting medium.

4. The stackable tray of claim 1 wherein the peripheral sidewall includes a plurality of flanges constructed and arranged to allow the tray to be positioned relative to an adjacent tray.

5. The stackable tray of claim 4 wherein the flanges further include means for engaging each tray with a tray adjacent thereto.

6. The stackable tray of claim 5 further including a central hub, the hub constructed and arranged to allow the trays to be stacked in a manner in which the engagement means are linearly aligned.

7. The stackable tray of claim 1 wherein the bottom portion includes a plurality of drains.

8. The stackable tray of claim 1 fabricated of a polymeric material.

9. The stackable tray of claim 8 wherein the polymeric material comprises a polyethylene.

10. The stackable tray of claim 8 wherein the polymeric material comprises a recycled polymer.

11. The stackable tray of claim 1 further including an O-ring for achieving the seal between adjacent trays.

12. The stackable tray of claim 1 further including a port to allow the interior of the tray to be monitored.

13. The stackable tray of claim 1 including a plurality of openings formed in said bottom portion to provide fluid communication between said plenum and said region.

14. The stackable tray of claim 13 including a plurality of ribs formed in said bottom portion, said openings being formed in said ribs.

* * * * *